United States Patent
Iezzi

(10) Patent No.: US 12,375,113 B2
(45) Date of Patent: Jul. 29, 2025

(54) SYSTEM AND METHOD OF NOISE REDUCTION

(71) Applicant: Aeronix, Inc., Melbourne, FL (US)

(72) Inventor: Steven L. Iezzi, Melbourne, FL (US)

(73) Assignee: Aeronix, Inc, Melbourne, FL (US)

( * ) Notice: Subject to any disclaimer, the term of this patent is extended or adjusted under 35 U.S.C. 154(b) by 86 days.

(21) Appl. No.: 18/491,867

(22) Filed: Oct. 23, 2023

(65) Prior Publication Data
US 2024/0056113 A1 Feb. 15, 2024

Related U.S. Application Data

(63) Continuation of application No. 17/813,459, filed on Jul. 19, 2022, now Pat. No. 11,888,506.

(60) Provisional application No. 63/262,697, filed on Oct. 19, 2021.

(51) Int. Cl.
H04B 1/10 (2006.01)

(52) U.S. Cl.
CPC ......... H04B 1/1081 (2013.01); H04B 1/1027 (2013.01)

(58) Field of Classification Search
CPC .............................. H04B 1/1081; H04B 1/1027
See application file for complete search history.

(56) References Cited

U.S. PATENT DOCUMENTS

| | | | |
|---|---|---|---|
| 8,644,410 B2 | 2/2014 | Suzuki et al. | |
| 9,851,461 B1 * | 12/2017 | Ainsleigh | G01V 1/001 |
| 10,411,744 B1 | 9/2019 | Wilson et al. | |
| 11,031,028 B2 | 6/2021 | Osako et al. | |
| 2004/0235439 A1 * | 11/2004 | Husted | H04B 17/309 455/179.1 |
| 2006/0208945 A1 * | 9/2006 | Kolanek | H01Q 3/2605 342/383 |
| 2010/0239052 A1 * | 9/2010 | Ballester | H04B 1/719 375/340 |
| 2020/0213728 A1 * | 7/2020 | Lopatka | G01S 3/8083 |
| 2025/0070835 A1 * | 2/2025 | Long | H04B 7/0617 |

OTHER PUBLICATIONS

USPTO Office action in related U.S. Appl. No. 17/813,459 issued May 8, 2023; 13 pages.

* cited by examiner

*Primary Examiner* — Janice N Tieu
(74) *Attorney, Agent, or Firm* — Kelly G. Swartz; Widerman Malek, PL

(57) ABSTRACT

A method for signal detection including the steps of: (1) iteratively acquiring sets of signal samples in a time domain N times; (2) iteratively applying a first transform to each iteratively captured samples in the time domain to convert each set of samples in the time domain to a corresponding subsequent set of samples in a frequency domain; (3) iteratively creating array rows using each of the sets of samples in the frequency domain wherein each subsequent array row has a length N; (4) appending each subsequent array row to the array until a second axis representing time reaches length N; (5) applying a second transform to the array to create a plurality of layers of spectral content; (6) determining a location of a signal of interest within the array based on a threshold; and (7) applying a bounding box to the array to isolate the signal of interest.

11 Claims, 2 Drawing Sheets

SYSTEM AND METHOD OF NOISE REDUCTION

RELATED APPLICATIONS

This application is a continuation application of and claims priority under 35 U.S.C. § 120 of U.S. patent application Ser. No. 17/813,459 filed on Jul. 19, 2022 and titled SYSTEM AND METHOD OF NOISE REDUCTION, which in turn claims priority under 35 U.S.C. § 119(e) of U.S. Provisional Patent Application Ser. No. 63/262,697 filed on Oct. 19, 2021 and titled DIGITAL HIGH PROBABILITY OF INTERCEPT RECEIVER. The contents of these applications are incorporated herein by reference.

FIELD OF THE INVENTION

The present invention relates to systems and methods for detecting signals. More specifically, the present invention relates to a method for extracting a signal of interest from an acquired signal containing noise.

BACKGROUND OF THE INVENTION

It is possible to detect certain objects in an environment by detecting characteristics associated with those objects. In some instances, objects may emit a distinctive signal. A signal associated with an object that one desires to detect or locate may be referred to as a signal of interest (SOI). SOIs may be produced at random times, may be bounded in frequency, and may be bounded in duration. To observe these SOIs from a distance that is far enough away from the object to avoid detection of the observer requires a receiver with a sensitivity bounded by the relevant noise level consistent with a narrow bandwidth. However, these receivers must scan the entire spectrum of interest to opportunistically capture these signals. These limitations create a high probability that the SOI will go undetected because the receiver is only viewing a given portion of the spectrum for a limited period.

Known High Probability of Intercept (HPOI) receivers may instantaneously stare at the entire spectrum in which the SOI may be contained, resulting in a substantial likelihood of detecting burst signals. But known HPOIs suffer from a notable level of thermal noise and sensitivity to interferers in the spectrum of the SOI.

Known HPOI receivers are currently specified for signal intelligence applications with high standoff. Objects that can be detected with high standoff generally generate SOIs produced by emitters at high radiated power and can be detected through the measurement of the integrated signal amplitude imposed on the signal from an HPOI antenna. The high standoff is required to mitigate the presence of emissions from patterns of life such as cellular and WIFI communications from the receiver input.

However, modern sources of SOIs that utilize frequency hopping or spread spectrum technology distribute the transmitted energy over a wider spectrum such that the emission effectively exists below the thermal noise floor of a HPOI receiver even in a high standoff location. Furthermore, frequency hopping algorithms may utilize a hop set directed by a pseudorandom sequence protected by a strong encryption algorithm preventing a receiver from predicting the location of the next emission. It is unlikely that a successful tracking algorithm could be developed that would detect and identify these signals.

To address the limitations of a conventional HPOI receiver, a novel method is needed to detect SOIs that may be obfuscated by noise.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method for signal detection including the steps of: (1) acquiring a first set of samples of a signal in a time domain; (2) applying a first transform to the first set of samples in the time domain to convert the first set of samples in the time domain to a first set of samples in a frequency domain; (3) creating a first row of an array using the first set of samples in the frequency domain wherein the row has a first axis of length N representing frequency; (4) iteratively capturing subsequent sets of samples of the signal in the time domain N−1 times; (5) iteratively applying the first transform to each iteratively captured subsequent set of samples in the time domain to convert each subsequent set of samples in the time domain to a corresponding subsequent set of samples in the frequency domain; (6) iteratively creating a subsequent array row using each of the subsequent sets of samples in the frequency domain wherein each subsequent array row has a length N; (7) appending each subsequent array row to the array until a second axis representing time reaches length N; (8) applying a second transform to the array to create a plurality of layers of spectral content; (9) performing a first analysis on the plurality of layers of spectral content to create a histogram of energy levels; (10) performing a second analysis on the histogram to determine a location of a signal of interest within the array based on a threshold; (11) determining a bounding box to apply to the array based on the location of the signal of interest within the array; and (12) applying the bounding box to the array to isolate the signal of interest.

The second transform may include the step of applying a two-dimensional finite impulse response filter with a basis function to the array.

The second transform may further include the steps of: (1) using a finite impulse response filter with an optimized basis function transfer function to divide a frequency range of the array into an upper frequency half and a lower frequency half; and (2) passing the lower frequency half to form a first layer of the plurality of layers of spectral content.

The second transform may still further include the steps of: (1) dividing the upper frequency half into a subsequent upper frequency half and a subsequent lower frequency half; (2) passing the subsequent lower frequency half to form a second layer of the plurality of layers of spectral content; (3) iteratively dividing each subsequent upper frequency half into subsequent upper frequency and lower frequency halves; and (4) passing each subsequent lower frequency half to form a subsequent layer of the plurality of layers of spectral content.

The method may include the step of creating a number of layers of spectral content equal to the order of the transform.

In one embodiment, the basis function may be a burst function beginning, ending, and oscillating about zero.

In one embodiment, the second analysis may determine the threshold through analysis of the peaks, valleys, or curvature of the histogram.

In one embodiment, the second analysis may determine the threshold based on clustering in the histogram.

In one embodiment, the second analysis may determine the threshold based on entropy of the histogram.

In one embodiment, the content of the plurality of layers below a derived frequency threshold may be deprecated to reduce noise.

The method may include the step of recombining the content of the plurality of layers to create a second array with less noise than the array.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

Figure 1:
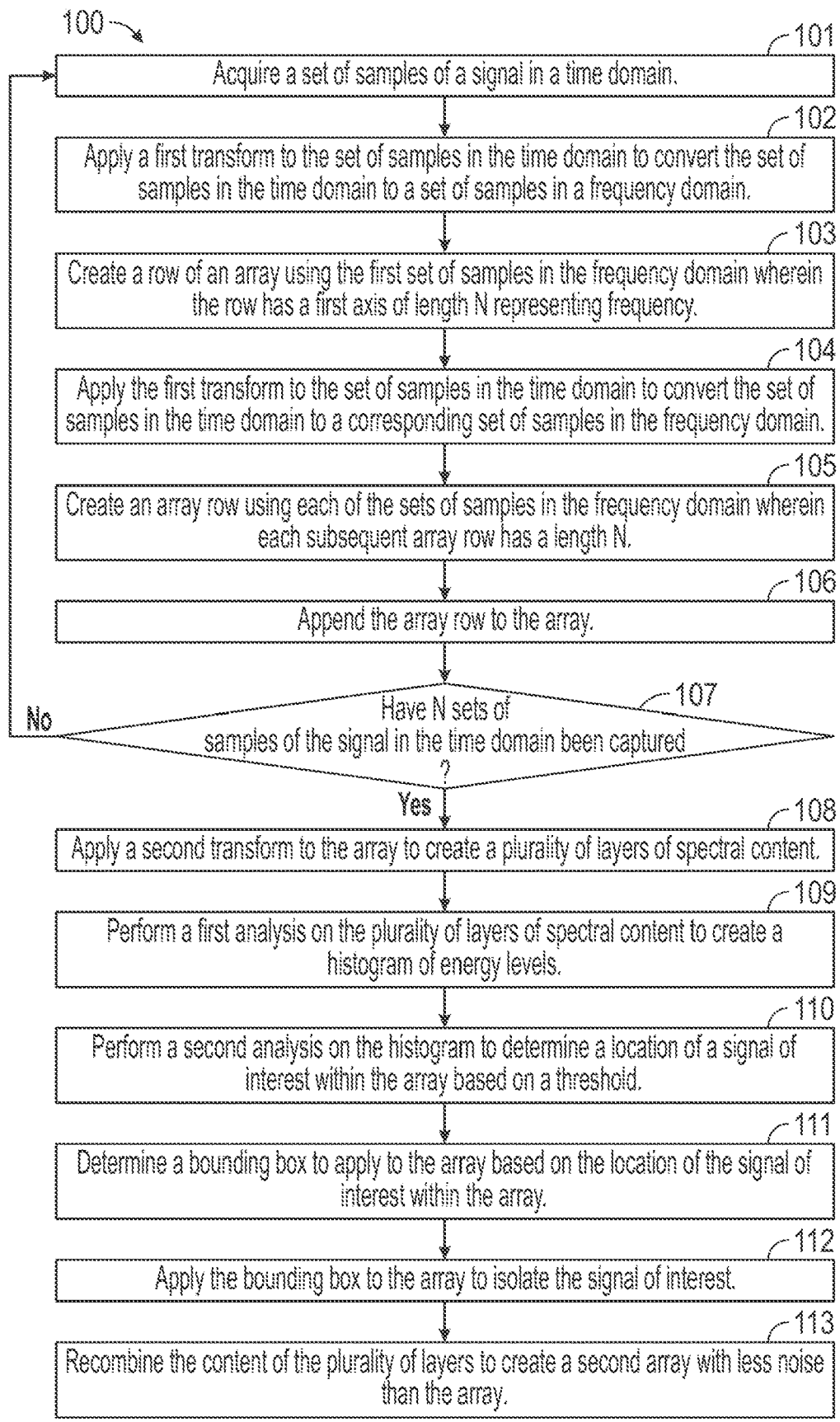
FIG. 1 is a flow chart of a method of signal detection according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a method of signal detection 100. The inventive method 100 may use a data transform algorithm to process the information received from a HPOI receiver. The data transform algorithm may spread the noise over a multi-dimensional array, resulting in a signal of interest (SOI) that may be detected and extracted from the larger data set even if it exists below the noise floor of a sampled time-domain data set.

The inventive method 100 may include two data transforms. The first transform may include a Fast Fourier Transform (FFT). This first transform may generate a two-dimensional spectrogram which distributes thermal noise over the entire array while consolidating the bounded SOIs to a region of the array to improve the effective signal to noise ratio (SNR). A second transform may include a wavelet basis function and may be applied to the spectrogram, operating on the differential amplitudes of the noise energy in the array.

The basis function of the second transform may be optimized to yield the highest ratio of the energy in the SOIs to the energy in the distributed noise through evaluation of the spectral characteristics of the spectrogram using a trained fully convolutional neural (FCN) network.

The array produced by the first transform and second transform exposes the SOI with an optimized signal to noise ratio such that the signal can be bounded and extracted from the larger data set.

The inventive method 100 produces a layered two-dimensional data set that resembles a layered image and can be analyzed using image processing techniques The first transform may be a frequency transform. A signal sampled by a H POI receiver at an interval in time may produce a data sequence that represents a series of values corresponding to the amplitude at the input to the data converter. The first transform may be applied to a set of time samples, creating a one-dimensional array as a function of frequency. Each sample (defined as a bin) represents the energy present in the portion of the spectrum associated with the bin. The energy in the bin can be calculated as a percentage of the total energy of the sampled spectrum my multiplying the energy in the bin times the total energy across the spectrum divided by the number of bins. Subsequent sets of time samples of the same length may be transformed into additional frequency bins creating a two-dimensional data set where one axis of the array represents frequency, and the other axis represents time. The process is repeated until the length of the axis in the time domain equals the length of the axis in the frequency domain, which results in a square array, also referred to as a spectrogram.

The second transform may be a wavelet transform. The second transform may be applied to the spectrogram using a two-dimensional finite impulse response filter architecture with the basis function selected during an optimization process, which will be described later, serving as the transfer function in the filter. The filter response of the second transform may be low pass and divide the spectrogram into two parts. The information passed by the filter may contain the lower frequency energy levels of the spectrogram. The remaining information, containing high frequency energy levels, may be reprocessed by the transform. This process may be executed iteratively with the low frequency portion of the resulting spectrogram retained, and the high frequency spectrogram is again divided into two at a higher frequency from the first function. This is repeated each time retaining the low frequency spectrogram and dividing the high frequency spectrogram with each iteration of the retained low frequency spectrogram building a layer. Each of the layers represents a portion of the spectral content.

After applying the first transform and the second transform, potential SOI previously obscured by noise and interference in the initial time-domain sampled data set may now be exposed in such a way that a subset of samples can be extracted that fully specify information that defines the characteristics of the SOI. The signal discrimination process may identify and extract bins that contain potential SOI by analyzing the characteristics of the transformed data set contained in the layers generated by the second transform.

The layered spectrogram is generated in such a way that the data set resembles a color image where each color represents a layer of the image. This structure can take advantage of processing algorithms that are designed to identify and extract features or sub-images from the data set. Discrimination algorithms designed to process images and extract features, or sub-images may be applied to this data set as detailed below.

The combined first transform and second transform process distributes the noise over the entire array while consolidating SOI in a bounded time, frequency, and spectral energy region of the array. Because the total noise energy is distributed over many bins, the noise in each bin is reduced. This noise reduction effectively improves the signal to noise ratio (SNR) for SOI whose energy occupies a small number of bins. The improvement in SNR exposes additional potential SOI that would otherwise not be detectable.

After the spectrogram is created, it may be analyzed to produce a histogram of the energy levels present. The histogram may be analyzed using an algorithm that divides the spectrogram into two classifications. The first classification contains bins that may contain SOI. The second classification contains bins that are not likely to contain SOI. Different algorithms may be utilized to classify the bins of the spectrogram. By way of example, and not as a limitation, histogram methods, clustering methods, or entropy methods may be used to classify the bins. In a histogram method, a histogram is generated from the energy distribution of the array. The peaks, valleys and curvature of the histogram are analyzed to produce a threshold. In a clustering method, gray-level samples are divided into two regions, background and foreground, or, alternatively, modeled as a mixture of two Gaussian distributions. In an entropy method, algorithms analyze the image and divide the foreground and background of the image based on the entropy of the energy levels of the bins.

The derived threshold calculated in the analysis of the histogram to classify the bins may be applied to the spectrogram resulting from the first transform. Applying this threshold may identify the region of the spectrogram that is deemed to contain SOI. The identified region may then be expanded by a factor to create a bounding box that captures additional samples to ensure that the entire signal of interest is identified. Those samples within the bounding box may be extracted from the original data set for characterization and classification.

An optimization process may be utilized to determine the basis function to use in the second transform. Energy received by a HPOI receiver is primarily a result of the thermal noise intrinsic to the RF spectrum. However, spectral characteristics of the noise are affected by the channel characteristics defined by the regional properties of the propagation environment. The basis function of the second transform may be optimized to yield the highest effective SNR.

The second transform divides the spectrogram into layers with each layer containing information related to the differential energy level of the bins in the source array. The second transform uses a basis function in a two-dimensional finite impulse response filter applied to each sample of the array performing a low pass filter operation. The properties that define the second transform function may include selection of the basis function, order of the transform, and filter frequencies. The basis function may be selected to be a burst function that begins, ends, and oscillates about zero. The definition of the basis function may encompass several bounded oscillatory functions that are applicable as the second transfer function. Each function will yield a different performance result. The order of the transform defines the number of filter operations and subsequently, the number of layers produced by the transform. The order of the second transform may be selected to optimize overall performance of the inventive method 100. Higher orders may yield improvements in performance at the cost of additional computation. Each wavelet filter operation may be performed at a frequency of interest. Wavelet filter operations may be done at uniform distributions across the frequency spectrum. The optimization of filter frequency may select the optimal frequency for each individual filter operation.

An FCN network that is trained to analyze the characteristics of the noise and select the function, filter frequencies, and order that yields the highest performance may be utilized. This FCN network may be trained by applying different sets of optimization properties to a known spectrogram to derive the SNR for each set of optimization properties. Many arrays may be used as training models, each may be derived from a unique combination of channel characteristics to simulate what is expected to be captured by an operational system.

In one embodiment of the invention, as depicted in FIG. 1, the method of signal detection 100 may include the steps of: (1) acquiring a first set of samples of a signal in a time domain 101; (2) applying a first transform to the set of samples in the time domain to convert the set of samples in the time domain to a set of samples in a frequency domain 102; (3) creating a row of an array using the first set of samples in the frequency domain wherein the row has a first axis of length N representing frequency 103; (4) applying the first transform to the set of samples in the time domain to convert the set of samples in the time domain to a corresponding set of samples in the frequency domain 104; (5) creating an array row using each of the sets of samples in the frequency domain wherein each subsequent array row has a length N 105; (6) appending the array row to the array 106; (7) repeating steps 102-106 until N sets of samples of the signal in the time domain have been captured 107; (8) applying a second transform to the array to create a plurality of layers of spectral content 108; (9) performing a first analysis on the plurality of layers of spectral content to create a histogram of energy levels 109; (10) performing a second analysis on the histogram to determine a location of a signal of interest within the array based on a threshold 110; (11) determining a bounding box to apply to the array based on the location of the signal of interest within the array 111; (12) applying the bounding box to the array to isolate the signal of interest 112; and (13) recombining the content of the plurality of layers to create a second array with less noise than the array 113.

Figure 2:
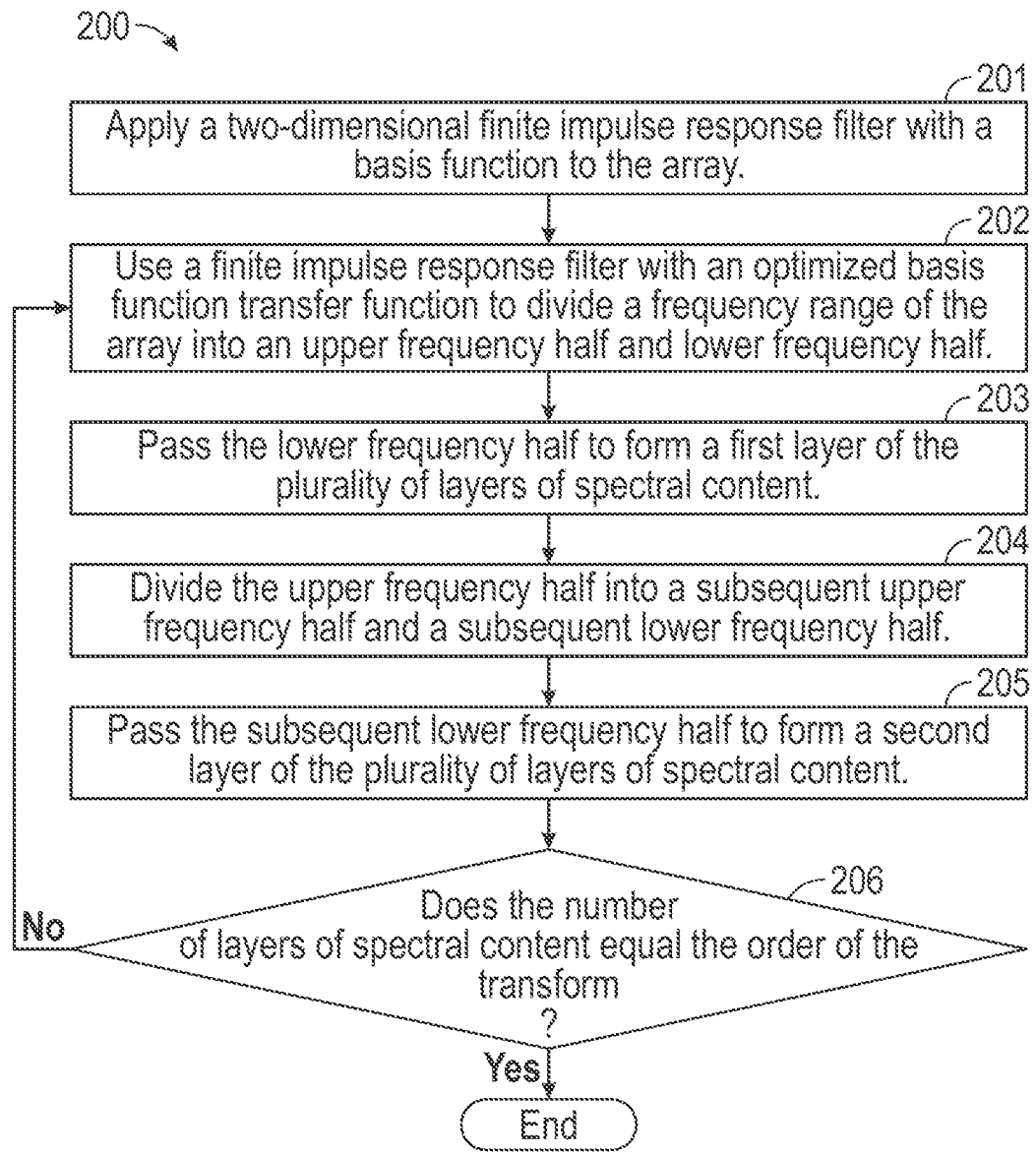
FIG. 2 is a flow chart of the second transform of the method of signal detection of FIG. 1 according to an embodiment of the present invention.

In one embodiment of the invention, as depicted in FIG. 2, the second transform includes the steps of: (1) applying a two-dimensional finite impulse response filter with a basis function to the array 201; (2) using a finite impulse response filter with an optimized basis function transfer function to divide a frequency range of the array into an upper frequency half and a lower frequency half 202; (3) passing the lower frequency half to form a first layer of the plurality of layers of spectral content 203; (4) dividing the upper frequency half into a subsequent upper frequency half and a subsequent lower frequency half 204; (5) passing the subsequent lower frequency half to form a second layer of the plurality of layers of spectral content 205; and (6) repeating steps 202-205 until the number of layers of spectral content equals the order of the transform 206.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for signal detection comprising the steps of:
   acquiring a first set of samples of a signal in a time domain;
   applying a first transform to the first set of samples in the time domain to convert the first set of samples in the time domain to a first set of samples in a frequency domain;
   creating a first row of an array using the first set of samples in the frequency domain wherein the row has a first axis of length N representing frequency;
   iteratively capturing subsequent sets of samples of the signal in the time domain N−1 times;
   iteratively applying the first transform to each iteratively captured subsequent set of samples in the time domain to convert each subsequent set of samples in the time domain to a corresponding subsequent set of samples in the frequency domain;
   iteratively creating a subsequent array row using each of the subsequent sets of samples in the frequency domain wherein each subsequent array row has a length N;
   appending each subsequent array row to the array until a second axis representing time reaches length N;
   applying a second transform to the array to create a plurality of layers of spectral content;
   performing a first analysis on the plurality of layers of spectral content to create a histogram of energy levels;
   performing a second analysis on the histogram to determine a location of a signal of interest within the array based on a threshold;
   determining a bounding box to apply to the array based on the location of the signal of interest within the array; and
   applying the bounding box to the array to isolate the signal of interest.

2. The method according to claim 1 wherein the second transform comprises the steps of:
   applying a two-dimensional finite impulse response filter with a basis function to the array.

3. The method according to claim 2 wherein second transform further comprises the steps of:
   using a finite impulse response filter with an optimized basis function transfer function to divide a frequency range of the array into an upper frequency half and a lower frequency half; and
   passing the lower frequency half to form a first layer of the plurality of layers of spectral content.

4. The method according to claim 3 wherein the second transform further comprises the steps of:
   dividing the upper frequency half into a subsequent upper frequency half and a subsequent lower frequency half;
   passing the subsequent lower frequency half to form a second layer of the plurality of layers of spectral content;
   iteratively dividing each subsequent upper frequency half into subsequent upper frequency and lower frequency halves; and
   passing each subsequent lower frequency half to form a subsequent layer of the plurality of layers of spectral content.

5. The method according to claim 4 further comprising the steps of:
   creating a number of layers of spectral content equal to the order of the transform.

6. The method according to claim 2 wherein the basis function is a burst function beginning, ending, and oscillating about zero.

7. The method according to claim 1 wherein the second analysis determines the threshold through analysis of the peaks, valleys, or curvature of the histogram.

8. The method according to claim 1 wherein the second analysis determines the threshold based on clustering in the histogram.

9. The method according to claim 1 wherein the second analysis determines the threshold based on entropy of the histogram.

10. The method according to claim 1 wherein content of the plurality of layers below a derived frequency threshold is deprecated to reduce noise.

11. The method according to claim 10 further comprising the step of:
   recombining the content of the plurality of layers to create a second array with less noise than the array.

\* \* \* \* \*